J. RAHILL.
Artificial Horizon for Quadrants.
No. 33,104. Patented Aug. 20, 1861.
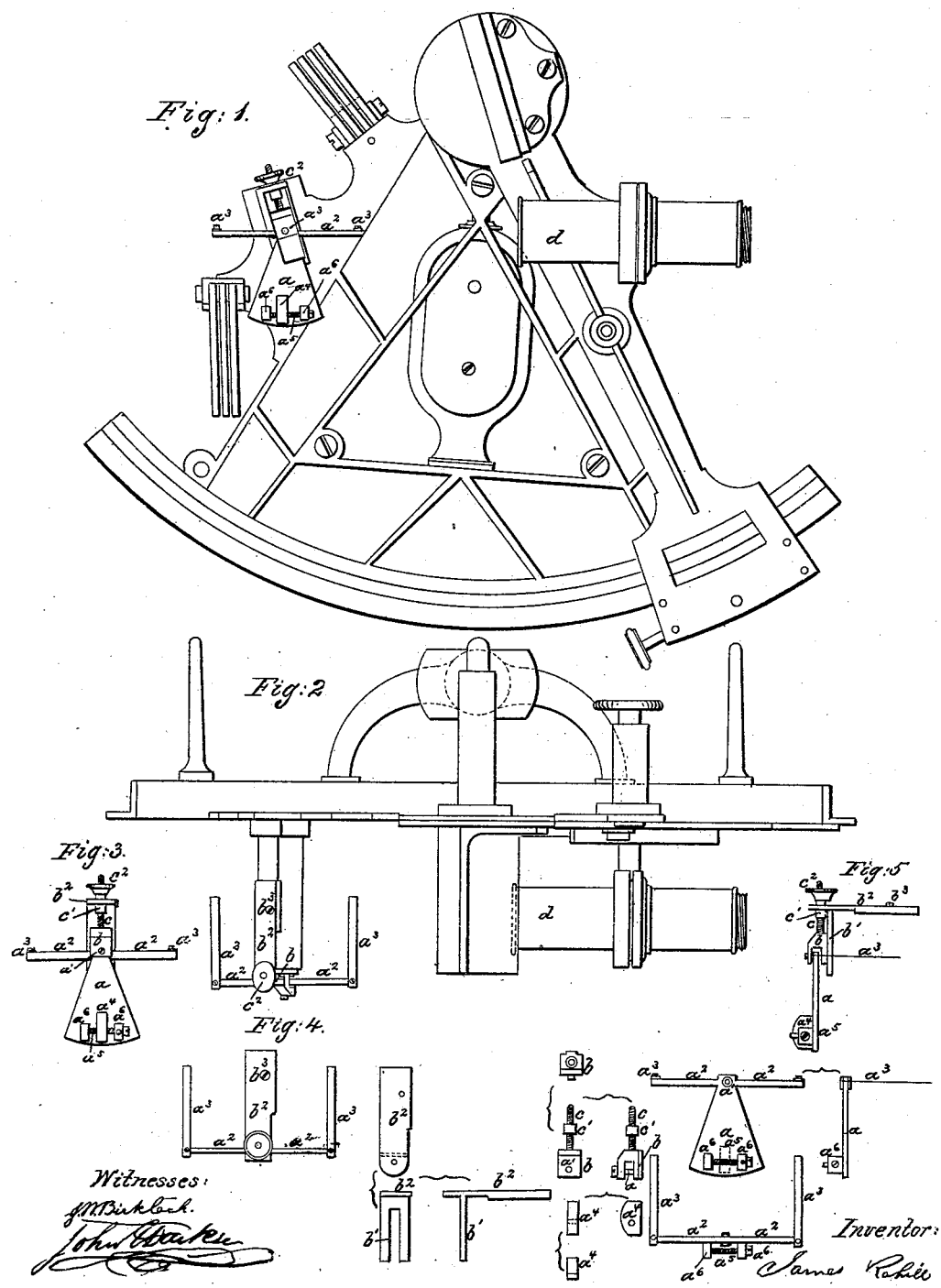

UNITED STATES PATENT OFFICE.

JAMES RAHILL, OF RAMSGATE, ENGLAND.

ARTIFICIAL HORIZON FOR QUADRANTS.

Specification of Letters Patent No. 33,104, dated August 20, 1861.

*To all whom it may concern:*

Be it known that I, JAMES RAHILL, of Ramsgate, in the county of Kent, England, gentleman, a citizen of the United States of America, have invented or discovered new and useful Improvements in Quadrants, Sextants, or other Similar Instruments to which Artificial Horizons are Applicable; and I, the said JAMES RAHILL, do hereby declare the nature of the said invention, and in what manner the same is to be performed, to be particularly described and ascertained in and by the following statement thereof—that is to say:

This invention has for its object improvements in the arrangement and construction of artificial horizons suitable for being applied to quadrants, sextants, or other similar instruments for measuring altitudes or angles by which the altitude of the sun or other heavenly body may be ascertained when the true horizon is obscured.

My improvements consist in employing a pendulum connected to a horizontal bar to the end of which are attached two thin bars or arms standing at right angles to the pendulum (by preference one on each side of the horizon glass) and I prefer to place the axis of motion of the pendulum about the center of the horizon glass in a line with the center of the tube or eye piece through which the observation is taken, the said two bars or arms when properly adjusted to the true horizontal plane forming a true and reliable horizon for measuring altitudes or angles as is well understood and the horizontal arms or bars may be readily adjusted with the true horizon from time to time to ascertain the correctness of the instrument by means of a movable weight attached to the pendulum and capable of adjustment by means of a screw or otherwise. And in order that my invention may be more fully understood and readily practiced I will proceed to describe the drawing hereunto annexed.

Figure 1 shows a side view and Fig. 2 a plan of a sextant having my improvements applied thereto. Fig. 3 shows a side view, Fig. 4 a plan, and Fig. 5 an end view of the pendulous apparatus, separately; the other figures show some of the parts separately.

$a$ is a pendulum suspended on a pin joint or axis at $a'$ carried by the support $b$ which is capable of sliding up and down in the vertical guide $b'$ forming part of the plate or bar $b^2$ which is fixed by a screw $b^3$ or in any other convenient manner to the frame of the horizon glass or to any other suitable part of the sextant or other similar instrument for measuring altitudes or angles.

$c$ is a screw fixed in the forked piece or support $b$. The screw $c$ passes up through a hole in end of the plate $b^2$ and $c'$ is a screw collar and $c^2$ a screw nut on the screw $c$ by which the height of the pendulum may be correctly adjusted and secured so as to place the two thin bars or arms $a^3$ $a^3$ fixed at right angles to the horizontal bar $a^2$ of the pendulum in a correct line with the center of the horizon glass.

$a^4$ is a movable weight which is capable of moving to and fro horizontally on the screw $a^5$ carried by the bearings $a^6$ fixed on the lower end of the pendulum $a$ by which means the horizontal position of the bars $a^3$ $a^3$ may be correctly adjusted.

It will be seen on examining the drawing that the axis of motion $a'$ of the pendulum $a$ is placed so as to be in a line or nearly so with the center of the horizon glass and of the tube or eye piece $d$ through which the observation is taken, and although I prefer this arrangement I do not intend to confine myself thereto as other arrangements of the parts may be adopted without departing from my invention and it will be easily understood by persons acquainted with the use of instruments of the above description how to adjust the horizontal arms or bars $a^3$ $a^3$ with the true horizon from time to time as opportunities offer and thus ascertain the correctness of the instrument for taking observations when the true horizon is obscured.

The artificial horizon is attached and used as follows:—Unscrew the nut $c^2$, Fig. 3; and pass the screw $c$, up through the shoulder $b^2$ which is attached to the horizon-glass frame of a sextant, or quadrant, by the screw $b^3$, as specified above. Secure the horizon by the nut $c^2$; look through the plane tube, and see if the two bars or arms $a^3$, $a^3$, Fig. 5, when in line, are about the center of the tube; and if they are not, they are to be adjusted to that position, by means of the loose collar $c'$, and nut $c^2$. Hold the sextant, or quadrant, vertically, keep the two bars $a^3$, $a^3$, Fig. 5, in one line, and bring the sun down, to touch them in the same manner as when taking an observation with the open horizon.

To adjust the artificial horizon:—When the apparent horizon is well defined, attach the artificial horizon in the manner described above; set the index of the sextant, or quadrant, as much to the right of zero, on the arc of the instrument, as the dip at the time of making the adjustment. The apparent horizon will then be seen in the silvered part of the horizon glass, reflected as much above the horizon seen direct, as the dip is, at the time of making the adjustment. Then, if the two bars, $a^3$, $a^3$, when seen in line, cut that reflected horizon, the artificial horizon is in adjustment; and if they do not, the pendulum weight $a^4$, must be screwed forward or backward, according as the two bars $a^3$, $a^3$, cut above or below the reflected horizon, until they cut the reflection exactly; the adjustment will then be perfect; and in all observations taken with the artificial horizon, calculation for dip must be omitted.

Having thus described the nature of my invention and the manner of performing the same I would have it understood that I do not claim the application of a pendulum or artificial horizon to quadrants sextants or other similar instruments for measuring altitudes, angles, &c., other arrangements of pendulous apparatus forming artificial horizons having been before applied thereto, but

What I claim is—

The arrangement and adaptation to instruments of the above description of a pendulum having one or more horizontal bars or arms and capable of adjustment with the true horizon and the center of the horizon glass and eye piece such bars or arms forming an artificial horizon which may be relied upon for taking observations when the true horizon is obscured.

JAMES RAHILL.

Witnesses:
G. H. BIRKBECK,
JOHN R. D. ACKER.